Aug. 12, 1930.                T. M. LILLEBERG                1,772,953
                                   CHUCK
                           Filed July 29, 1927            2 Sheets-Sheet 1
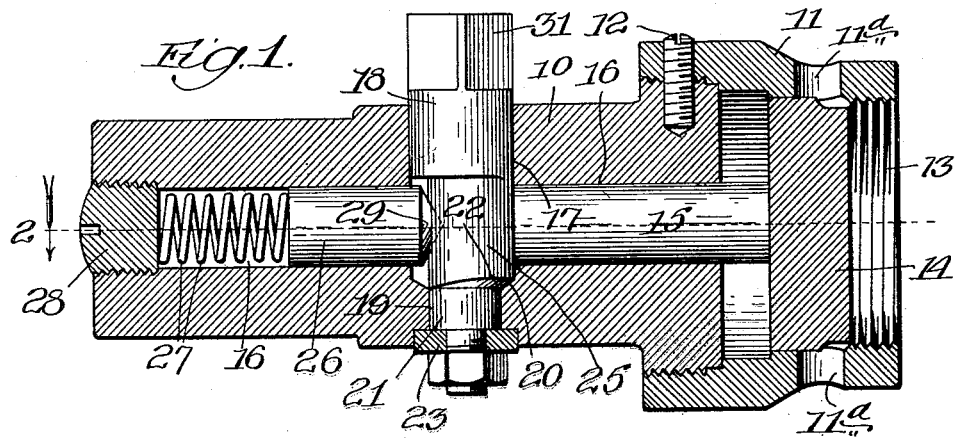
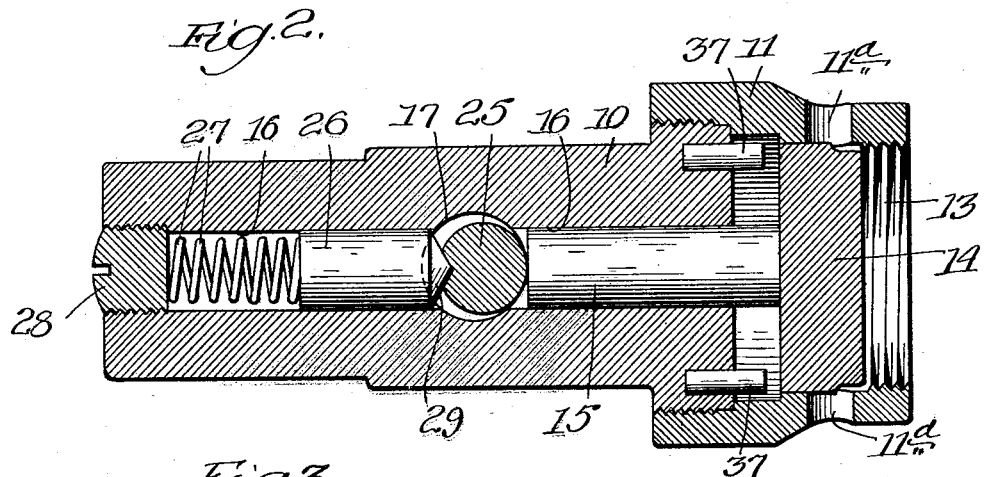
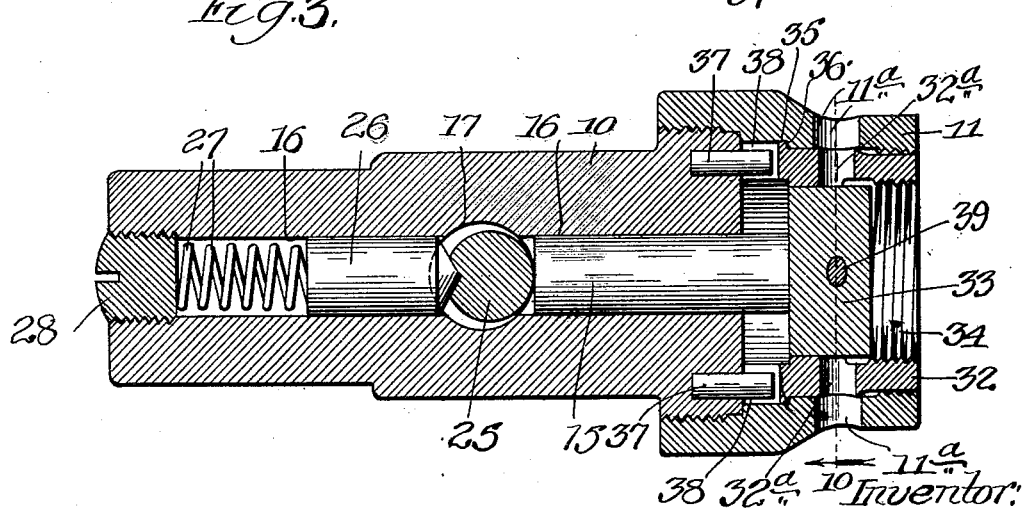
Inventor:
Tideman M. Lilleberg,
By Dyrenforth, Lee, Chritton & Wiles,
Attys.

Aug. 12, 1930.  T. M. LILLEBERG  1,772,953
CHUCK
Filed July 29, 1927  2 Sheets-Sheet 2
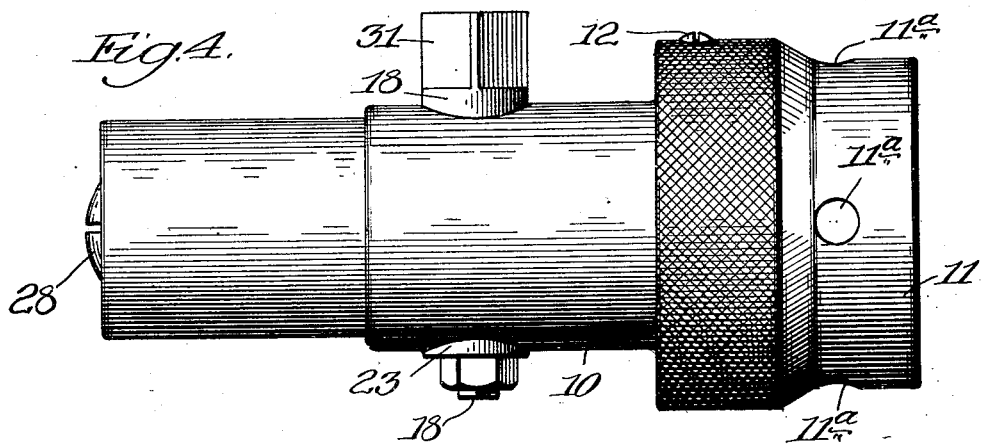
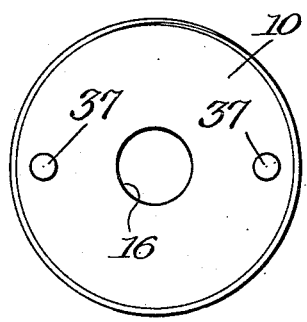
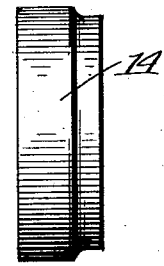
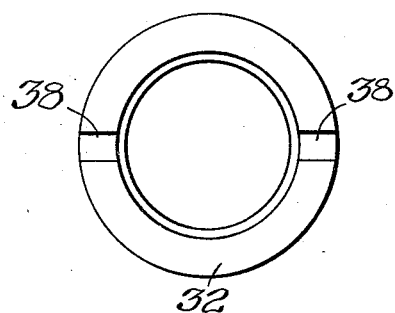
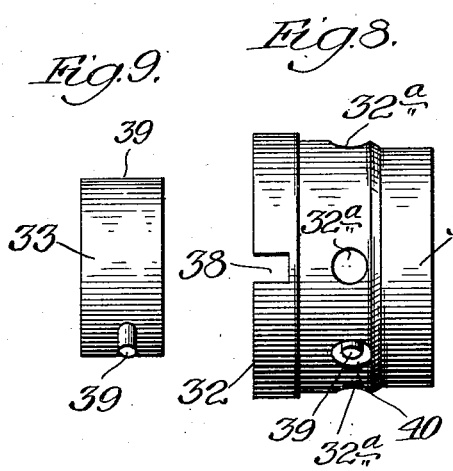
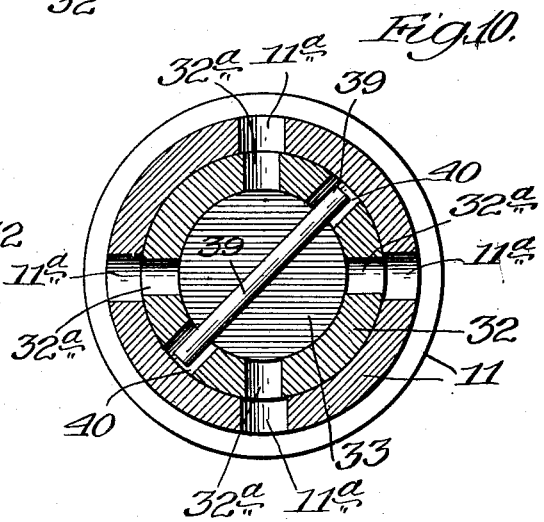
Inventor:
Tideman M. Lilleberg,
By Dyrenforth, Lee, Chritton & Wiles,
Attys.

Patented Aug. 12, 1930

1,772,953

UNITED STATES PATENT OFFICE

TIDEMAN M. LILLEBERG, OF CHICAGO, ILLINOIS, ASSIGNOR TO THE NYE TOOL & MACHINE WORKS, OF CHICAGO, ILLINOIS, A CORPORATION OF ILLINOIS

CHUCK

Application filed July 29, 1927. Serial No. 209,259.

My invention relates more particularly to chucks for use in the manufacture of objects, and more particularly pipe-coupling nipples, required to be threaded at opposite ends, with the threaded portions slightly tapering in opposite directions in accordance with common practice and requiring that the thread be formed on the object by cutting the thread from opposite ends of the object.

My invention relates more especially to chucks of the type provided with a threaded portion into which the preliminarily threaded end of the object, as for example a pipe-coupling nipple, is screwed to present beyond the chuck, the other end of the object to be threaded while held in the chuck, thereby to cause the object to be threaded as desired at both ends.

My primary objects are to provide a novel, simple, and economical construction of chuck of the type stated; to provide a chuck of the type referred to by which the object to be threaded will be securely held in the chuck, while permitting of the ready release of the object from the chuck after the threading operation has been effected; another object is to provide a chuck of this type which will be adapted for use with objects to be threaded of different diameters; and other objects as will be manifest from the following description.

Referring to the accompanying drawings:—

Figure 1 is a view in longitudinal section, with certain parts in elevation, of a chuck constructed in accordance with my invention. Figure 2 is a section taken at the line 2 on Fig. 1 and viewed in the direction of the arrow. Figure 3 is a view like Fig. 2 and of the construction therein shown, showing it conditioned, by the use of an adapter, for the holding of an object of smaller diameter than in its condition as disclosed in Figs. 1 and 2. Figure 4 is a view in side elevation of the chuck showing it as conditioned according to either Figures 1 or 3. Figure 5 is a view in end elevation of one of the sections of the body portion of the chuck. Figure 6 is a view in side elevation of the stop member of Figs. 1 and 2. Figure 7 is an inner end view of the adapter of Fig. 3. Figure 8 is a view in side elevation of the adapter of Fig. 7 with the stop member therein. Figure 9 is a view in side elevation of the stop member of Fig. 8; and Figure 10, a section taken at the line 10 on Fig. 3 and viewed in the direction of the arrow.

Referring first to the chuck device as conditioned in Figs. 1 and 2, the chuck comprises a body portion formed of the main body section 10 adapted to be inserted into the rotating head-stock of a threading machine in which it is held for rotation therewith in accordance with common practice, and a sleeve portion 11 screwed upon the outer end of the section 10 and shown as releasably held in place by a set screw 12, the outer end of the sleeve section 11 being internally threaded, as represented at 13 to adapt the preliminarily threaded end of an object, such as a pipe-coupling nipple (not shown) to be screwed into the outer end of this sleeve section.

Slidable in the sleeve section 11, is a stop member 14 in the form of a circular disk adapted to co-operate with the inner threaded end of the object to be held in the chuck, and form an abutment for the object, the disk 14 being backed by a bar 15 which is longitudinally movable in the forward end of a bore 16 extending centrally through the section 10 of the chuck. The section 10 is transversely apertured, to provide the opening 17 therethrough in which an eccentric, cam, device 18 cooperating with the bar 15, is rotatably mounted.

The opening 17 is restricted at one end as represented at 19 to provide a shoulder 20, the eccentric device 18, where it extends through the reduced portion 19 being of reduced diameter as represented at 21 thereby affording a shoulder 22 which opposes the shoulder 20 and, in conjunction with the washer 23, held in place by a nut 24 screwed on the end of the device 18, holds the latter against longitudinal displacement.

The eccentric portion of the device 18 is represented at 25 at which portion the device 18 directly opposes the inner end of the bar 15. Cooperating with the eccentric device 18 is a plunger rod 26 slidable in the bore 16 and backed by a coil spring 27 confined between this rod and a plug 28 screwed into the inner end of the chuck section 10. The forward end of the plunger rod 26 is of conical form as represented at 29 to adapt it to enter, under the action of the spring 27, a similarly shaped recess 30 in the side surface of the eccentric portion 25, opposite the high point of the latter.

In the use of the chuck described, and assuming the parts thereof to be shown in the position represented in Figs. 1 and 2, the operator screws into the outer threaded end of the sleeve section 11, the preliminarily threaded end portion of the object on which a thread is to be formed at its other end, the object being screwed up against the stop member 14. In the operation of forming the thread on the object held in the chuck the tendency is to screw the object farther into the sleeve, but this is resisted by the stop device 14 and thus the object to be threaded is firmly held in the chuck against independent rotation by the combined action of the threads 13 and the stop member 14. To remove the object from the chuck after being threaded as stated, the operator rotates the eccentric device 18, as by means of a wrench applied to the outer squared end 31 thereof, to move the low portion of the cam 25 opposite the inner end of the bar 15, thereby permitting the stop member 14 to back away from the inner end of the object and relieving any binding of the latter in the threads 13, whereupon the operator may readily unscrew the object from the sleeve 11.

As will be understood the spring-pressed plunger device 26 not only serves, upon entering the recess 30, to apprize the operator of the proper positioning of the eccentric relative to the bar 15 in the conditioning of the chuck to clamp an object therein, but also aids in preventing accidental rotation of the eccentric device 18 out of the position stated.

The chuck as disclosed is also adapted for the threading of objects of smaller diameter and for such use an adapter represented at 32 in Fig. 3 and a stop member for cooperation therewith and represented at 33, are provided.

The adapter 32 is of ring form with its outer end internally threaded as represented at 34 to permit the preliminarily threaded end of the object to be screwed therein and against the stop member 33, the inner end of the sleeve 32 being provided peripherally with a flange 35 at which it abuts against an annular shoulder 36 on the interior of the sleeve section 11. As a means whereby the adapter 32 may be caused to rotate with the body of the chuck, I provide on the body section 10 a pair of diametrically-opposed pins 37 which extend longitudinally thereof and project beyond the forward end of the latter, these pins being received into notches 38 in the inner end of the adapter 32 when the several parts are positioned as shown in Fig. 3.

The stop member 33 which is adapted for longitudinal movement in the adapter 32, as in the case of the stop member 14 of Figs. 1 and 2, is preferably permanently assembled with the adapter 32 to prevent accidental separation of these parts when disassembled from the other parts of the chuck. In the arrangement shown this is provided for by providing a radially-disposed pin 39 on the stop member 33 which extends at its projecting ends loosely into diametrically disposed openings 40 in the wall of the adapter 32. Thus while the member 33 is free to be shifted lengthwise in the adapter 32 it is held against separation therefrom.

It will be understood from the foregoing that to condition the tool of Figs. 1 and 2 for holding objects of smaller diameter than that for which the chuck as conditioned in these last-referred-to figures, is adapted, the operator unscrews the sleeve 11 and substitutes for the stop member 14 the adapter 32 and stop member 33, and thereupon re-screws the sleeve 11 upon the body section 10.

The object to be threaded is screwed into the adapter 32 and held in place therein during the threading operation, and thereafter released for withdrawal from the chuck in the same way as above described of the construction shown in Figs. 1 and 2.

The sleeve 11 is preferably provided with a circumferential series of radiating openings 11ᵃ shown as four in number and equidistantly spaced, and the adapted 32 is likewise provided with a series of radiating openings 32ᵃ which when these parts are assembled together to the position shown in Figs. 3 and 10 register with each other. In the arrangement shown in Fig. 1 the openings 11ᵃ afford outlets for the chips produced in the threading operation and in the arrangement shown in Fig. 3 these openings, together with the registering openings 32ᵃ in the adapter, form outlets for the chips.

While I have illustrated and described a particular embodiment of my invention, I do not wish to be understood as intending to limit it thereto, as the same may be variously modified and altered without departing from the spirit of my invention.

What I claim as new and desire to secure by Letters Patent is:—

1. A chuck formed of a body having an open end portion to receive part of the object to be threaded, a stop member mounted in said body portion for movement longitudinally therein generally in the direction of the longitudinal axis of the object and positioned for abutment at its forward end with the inner end of said object, a rotatable cam device on said body and cooperating with the inner end of said stop member, said cam device containing a recess between its ends, and a member in said body portion in substantial alinement with said stop member and adapted to enter said recess when the high portion of said cam device engages said stop member.

2. A chuck having a body section, a sleeve portion thereon adapted to receive an object, a stop member slidably disposed in the body section for engagement with the object, an operating device for the stop member arranged substantially transversely of the body section, said operating device having an eccentric portion engageable with the stop member, coacting shoulders on said operating device and body section preventing displacement of the operating device from the body section in one direction and fastening means on said operating device and engaging the body section to prevent displacement of the operating device in the opposite direction, and a plunger rod in said body section to lock said operating device.

3. A chuck having a body, a sleeve portion extending therefrom, an adapter to receive an object, said adapter being disposed within the sleeve portion, said sleeve and adapter having chip-outlet openings adapted to register, means to hold the adapter against outward displacement, and a pin extending from the body into said sleeve portion, and one end of the adapter abutting the body and having a recess engaged by said pin to cause the adapter to turn with the body and to maintain said openings in registry.

4. A chuck having a body provided with a sleeve portion, an adapter fitted within said sleeve portion to receive an object, said sleeve and adapter having lateral openings adapted to register to form outlets for chips, a stop device movably mounted in said body having a portion disposed within the adapter, means to operate the stop device, and a pin extending from said portion and loosely into one of the openings of the adapter to unitarily connect the adapter and stop device for turning with the body but to permit limited relative longitudinal movement thereof.

TIDEMAN M. LILLEBERG.